(12) United States Patent
Rodman et al.

(10) Patent No.: US 8,494,203 B2
(45) Date of Patent: Jul. 23, 2013

(54) SPEAKER AND SPEAKER ENCLOSURE

(75) Inventors: Jeffrey Rodman, San Francisco, CA (US); Wayne Stanley Foletta, San Martin, CA (US)

(73) Assignee: Polycom, Inc., San Jose, CA (US)

( * ) Notice: Subject to any disclaimer, the term of this patent is extended or adjusted under 35 U.S.C. 154(b) by 1741 days.

(21) Appl. No.: 11/742,308

(22) Filed: Apr. 30, 2007

(65) Prior Publication Data

US 2007/0280498 A1 Dec. 6, 2007

Related U.S. Application Data

(63) Continuation-in-part of application No. 11/421,022, filed on May 30, 2006, now Pat. No. 7,899,201.

(51) Int. Cl.
*H04R 1/02* (2006.01)
(52) U.S. Cl.
USPC ............ 381/345; 381/322; 381/353; 381/413
(58) Field of Classification Search
USPC .......................... 381/386, 345, 322, 353, 413
See application file for complete search history.

(56) References Cited

U.S. PATENT DOCUMENTS

| | | | | |
|---|---|---|---|---|
| 4,256,198 A | * | 3/1981 | Kawakami et al. | 181/141 |
| 7,769,162 B2 | * | 8/2010 | Knutson et al. | 379/406.01 |
| 2001/0055985 A1 | * | 12/2001 | Matt et al. | 455/570 |
| 2003/0063767 A1 | * | 4/2003 | Dedieu et al. | 381/345 |
| 2005/0213745 A1 | * | 9/2005 | Thomasson | 379/388.01 |

* cited by examiner

*Primary Examiner* — Davetta W Goins
*Assistant Examiner* — Amir Etesam
(74) *Attorney, Agent, or Firm* — Wong, Cabello, Lutsch, Rutherford & Brucculeri, L.L.P.

(57) ABSTRACT

Systems, methods, and devices for providing high quality speaker performance in a small-scale design are disclosed. In accordance with various embodiments of the present invention, a small-scale speaker assembly is provided which is capable of delivering high-fidelity wideband audio. The speaker assembly includes a speaker driver and a number of electronic components within an enclosure. In some embodiments at least one microphone is included in the assembly. In some embodiments the speaker assembly is well suited for audio conferencing. In some embodiments low-frequency performance is improved in a small-scale design.

34 Claims, 8 Drawing Sheets

SPEAKER AND SPEAKER ENCLOSURE

CROSS-REFERENCE TO RELATED APPLICATION

The present invention is a continuation-in-part of co-pending and commonly owned application Ser. No. 11/421,022, entitled "Speaker with Acoustic Damped Port," filed on May 30, 2006. The contents of said application are incorporated herein by reference.

BACKGROUND

1. Field of the Invention

The present invention relates generally to audio conferencing, and more particularly to systems, methods, and devices for improving speaker performance in a small-scale design.

2. Description of the Related Art

The frequency range of human hearing is generally considered to be between approximately 20 Hz and approximately 20 kHz. Human speech typically falls within the range of approximately 100 Hz to approximately 8 kHz. In conventional telephony, the frequency band is truncated outside a range from approximately 300 Hz to approximately 3400 Hz. More recently developed technologies such as VoIP (Voice over Internet Protocol), however, allow for a wider frequency range.

To produce low frequencies, a driver typically needs to have a sufficiently large diaphragm and enough mass to resonate at a low frequency. To produce high frequencies, a driver typically needs to have a sufficiently small diaphragm and a low mass. Woofers are the largest drivers, and are designed to produce low-frequency sounds. Tweeters are much smaller units, designed to produce the highest frequencies. A tweeter usually has a sealed back, while a woofer usually has an open back. With a sealed back, the tweeter creates sound waves on the front side only, while a woofer creates sound waves on both its front and back sides. Midrange drivers are typically used in multi-way speakers with three or more driver sizes. Some midrange drivers have open backs, and while some have sealed backs.

Figure 1:
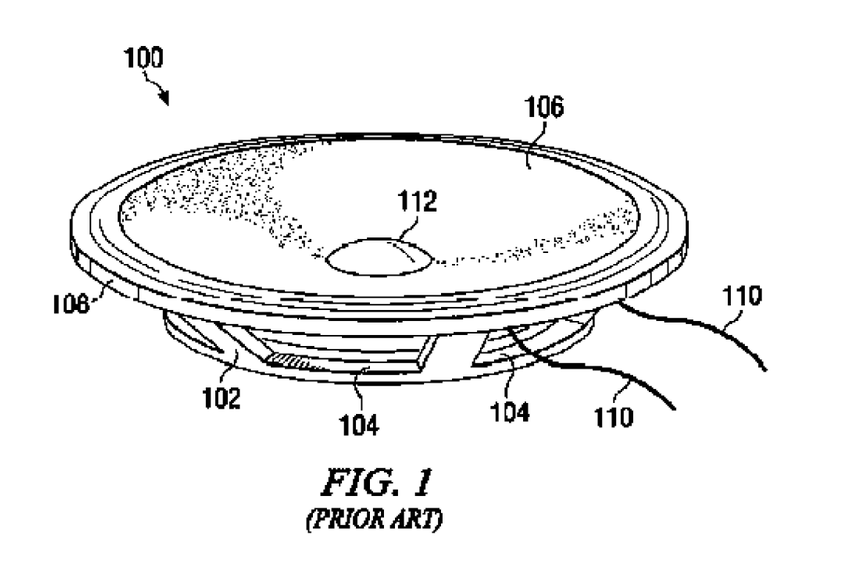
FIG. 1 depicts a perspective view of a prior-art speaker driver.
Figure 2A:
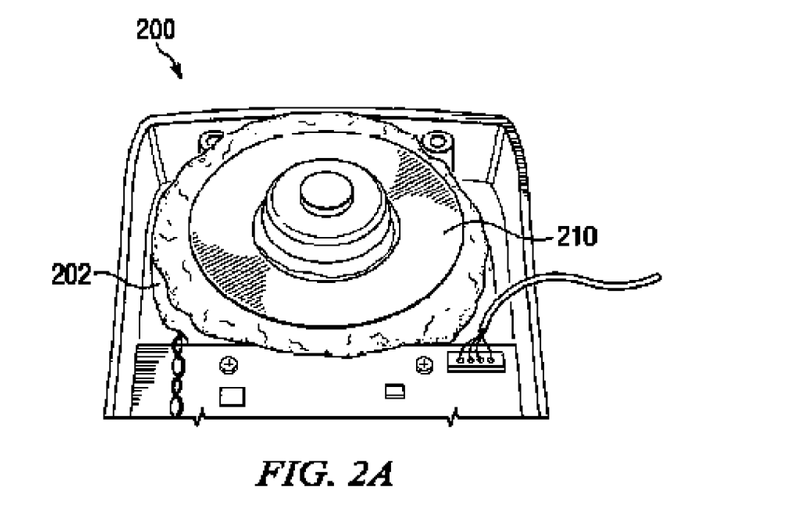
FIG. 2A depicts a perspective view of an exemplary speaker driver with damping material in accordance with various embodiments of the present invention.
Figure 2B:
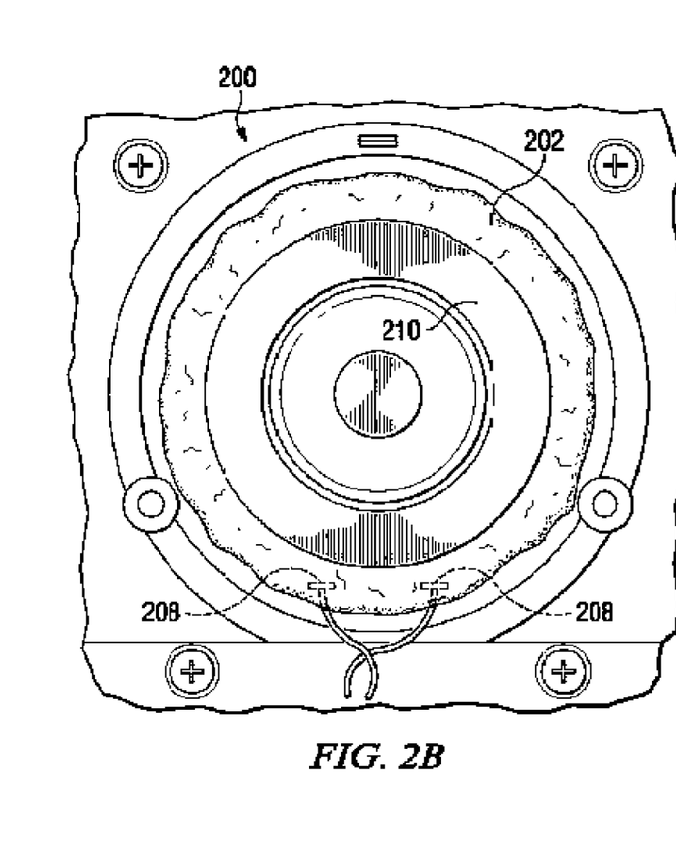
FIG. 2B depicts a bottom plan view of the exemplary speaker driver of FIG. 2A.
Figure 2C:
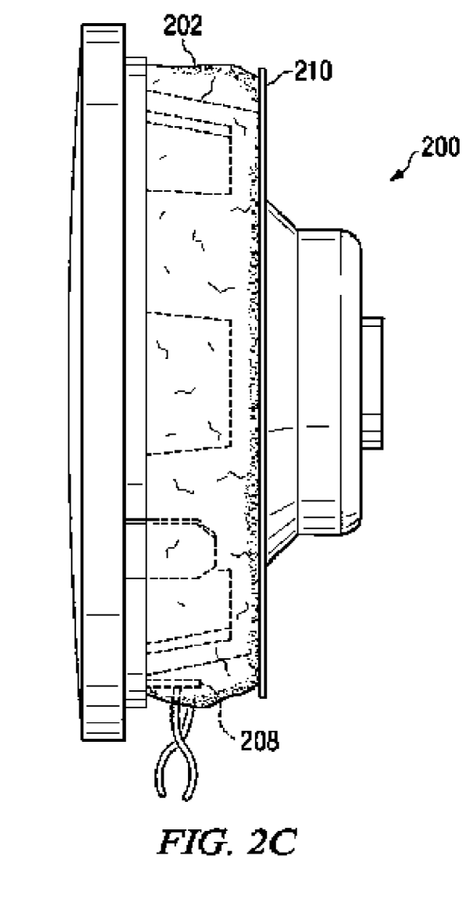
FIG. 2C depicts a side view of the exemplary speaker driver of FIG. 2A.
Figure 2D:
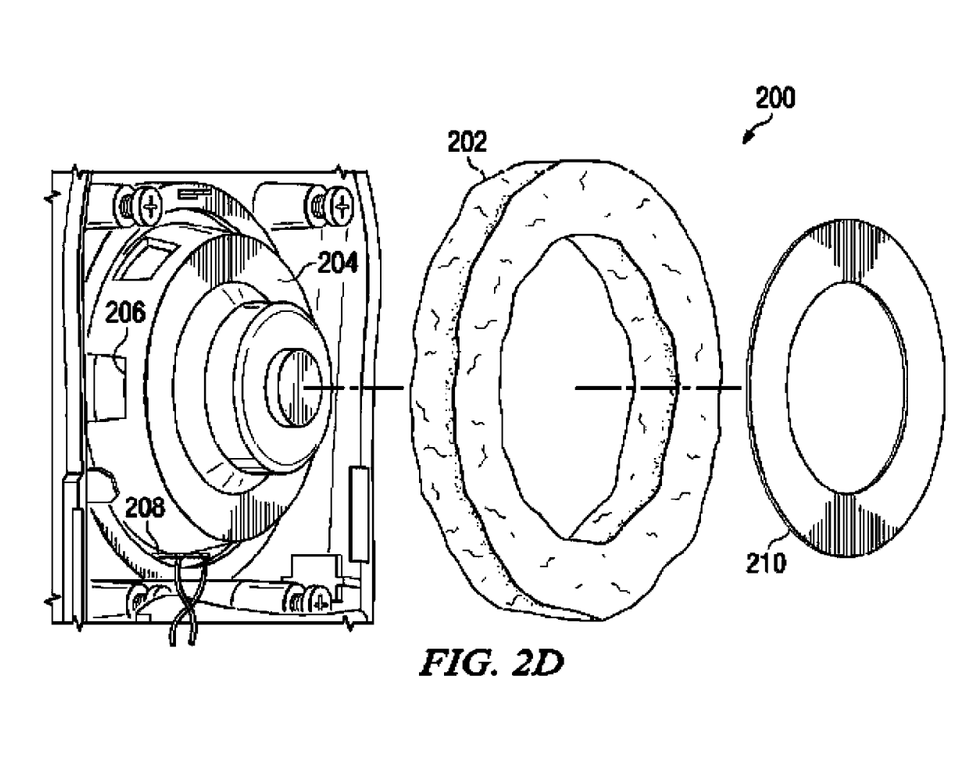
FIG. 2D depicts an exploded view of the exemplary speaker driver of FIG. 2A.

A basic prior-art speaker driver 100 with an open back is depicted in FIG. 1. The speaker driver 100 comprises a chassis 102 having a plurality of openings 104. The speaker driver 100 further comprises a diaphragm 106 attached to a suspension 108, which is attached to the chassis 102. The diaphragm 106 is attached to a voice coil 110 which is attached to the chassis 102 by a spider. Each end of the voice coil 110 is coupled to a connection terminal. A dust cap 112 covers a hole in the diaphragm 106.

It is difficult to make one speaker driver that reproduces sound waves over the entire frequency range of human hearing. Speaker units therefore typically divide a wide frequency range among multiple drivers. Most high-fidelity speakers include more than one size driver. This, however, can increase size, cost, and complexity. Indeed, a design conflict exists between size and performance.

One prior-art method for attempting to achieve high-quality sound in a small-scale design, seen in conventional speakerphone and speaker/microphone designs using acoustic suspension speakers, is to use a sealed speaker enclosure with the required acoustic volume to meet the minimum performance values at the lowest frequency. The electronics and support elements are placed outside the speaker enclosure, and the total is contained within a second enclosure. The total product package volume is the sum of the speaker enclosure volume plus the electronics and support elements volume, increasing cost and size.

Other prior-art systems avoid solving the problem by sacrificing performance. One common approach is to discard an enclosed speaker entirely and let the speaker operate with an open back, which reduces volume, compromises low frequency performance, and increases distortion. These systems are sometimes enclosed, but are not completely sealed.

SUMMARY

A need has therefore arisen to provide systems, methods and devices that overcome the limitations of the prior art. Embodiments of the present invention advantageously provide a speaker unit having a compact design without sacrificing sound quality. High-fidelity wideband is made possible in a compact speaker design.

The disclosure is directed to a speaker assembly for providing high-quality sound in a small form factor. The speaker assembly includes a speaker driver and processor housed within an enclosure. The enclosure can have a volume of less than about 7 cubic inches or less. According to one embodiment, the enclosure has an internal volume of about 6.5 cubic inches or even less. In spite of the small size, the speaker assembly disclosed herein is capable of producing a speaker response in the range of about 300 Hz to about 19 kHz. The speaker assembly may include additional features for providing high quality sound such as echo reduction. The assembly can also include one or more microphones.

The speaker assembly disclosed herein is particularly suited for providing high quality audio conferencing in a small, easily portable package. The speaker assembly can be coupled to a conferencing endpoint device such as an IP phone or a computer or the like. The coupling can be wireless or can be a wire connection such as a USB connection. The processor of the speaker assembly can be configured to provide full-duplex audio for high quality audio conferencing experience.

BRIEF DESCRIPTION OF THE DRAWINGS

A better understanding of the invention can be obtained when the following detailed description of the invention is considered in conjunction with the following drawings, in which.

DETAILED DESCRIPTION

FIGS. 2A through 2D depict various views of an exemplary speaker driver 200 with damping material 202. The speaker driver 200 includes a frame 204 having a forward portion and a rear portion. The forward portion is attached to a surround having a rim of compliant material, which is attached to a diaphragm. The rear portion has one or more vents 206 and forms a cage around the diaphragm. The speaker driver 200 also includes a connection terminal 208 which provides an electrical connection to the voice coil.

The damping material 202 is adjacent to the frame 204 and substantially covers or fills the one or more vents 206. The damping material 202 is in contact with the frame 204 and substantially covers a rear portion of the frame 204. In one embodiment, the damping material 202 is placed on the outside of the rear of the frame 204 and vents 206 to form a generally circular damping ring. In one embodiment, the damping material 202 forms a generally toroidal configuration.

The shape and configuration of the damping material 202 may substantially conform to the shape and configuration of the frame 204. For example, a circular shape may be used, as depicted in FIGS. 2A-2D, and accordingly the damping material 202 forms a generally circular damping ring. Alternatively, and as a non-limiting example, an elliptical shape may be used. As another non-limiting example, a square shape may be used. As a further non-limiting example, a rectangular shape may be used. Further still, an n-sided-polygon shape may be used. Indeed, a variety of different shapes and configurations are possible.

In one embodiment, the damping material 202 has a configuration generally following the surface of a frustum. For example, the damping material 202 may have a configuration generally similar to the surface of a generally conical frustum (i.e., a tapered cylinder). As another example, the damping material 202 may have a configuration generally similar to the outer surface of a generally pyramidal frustum (i.e., a truncated pyramid) having n trapezoidal faces.

The damping material 202 may be selected from any of a variety of materials. Examples of suitable materials include but are not limited to felt, fiberglass, and foam. The use of natural fibers may be used to provide added resistance to the acoustic energy waves brought about by interlocking fibers' rubbing against each other. Examples of natural fibers include without limitation wool, cotton, silk, linen, cashmere, hemp, ramie, and jute. Alternatively, a man-made or synthetic material having similar characteristics to rough natural fibers may be used. In some embodiments, a blend of two or more materials may be used. The blended materials may be all-natural, all-synthetic, or a combination of natural and synthetic. In one embodiment, a felt material comprising a blend of cotton and wool fibers has been found to be a suitable material.

The density of the damping material 202 may be optimally selected so as to provide a well-matched transmission line. If the density is too high (i.e., the damping material 202 is too tightly packed), then the impedance is too low; if the density is too low (i.e., the damping material 202 is too loosely packed), then the impedance is too high. In one illustrative embodiment, the density of the damping material 202 may be approximately 7 lbs/cu. ft. It should be appreciated, however, that other densities may be used.

The size of the damping material 202 may be selected according to, inter alia, the size of the speaker driver 200 and frame 204. Furthermore, the thickness of the damping material 202 may be subject to slight variation due to the nature of its composition. As a non-limiting example, in one embodiment, using a speaker driver 200 having a frame diameter in the range of approximately 50 mm to approximately 75 mm, the damping material 202 may be selected to be approximately 4 mm thick, approximately 10 mm wide, and approximately 150 mm in circumference. It should be appreciated, however, that other dimensions may be used.

The damping material 202 as described herein results in improved impedance matching with acoustic delay, without required dimensional tuning (as with conventional ports). It also reduces the air velocity gradients minimizing higher order frequency distortion components. The damping material 202 also acts as an absorber of energy by coupling to the sound wave.

In some embodiments, a regulating member 210 may be placed adjacent to a back side of the speaker frame 204 to confine the port and force air from the back side of the speaker frame 204 to travel radially through the damping material 202 rather than around it. The regulating member 210 may be attached to the back side of the speaker frame 204 by using an adhesive.

In one embodiment, the regulating member 210 may be cardstock paper. Alternatively, and as a non-limiting example, the regulating member 210 may be felt. As another non-limiting example, the regulating member 210 may be plastic. Other suitable materials may be used which function to regulate the air flow.

In one embodiment, the regulating member 210 may be generally annular, as depicted in FIGS. 2A-2D. The diameter of the regulating member 210 may be greater than the diameter of the back side of the frame 204 to which it is adjacent. In another embodiment, and as a non-limiting example, an elliptical shape may be used. As another non-limiting example, a square shape may be used. As a further non-limiting example, a rectangular shape may be used. Further still, an n-sided-polygon shape may be used. Indeed, a variety of different shapes and configurations are possible.

Figure 3A:
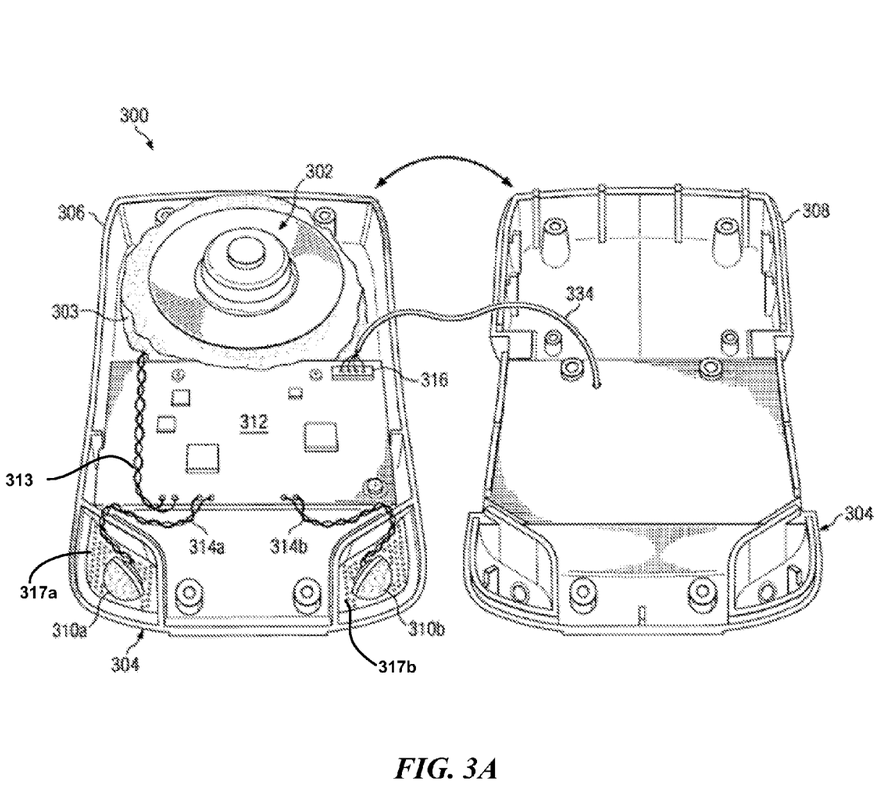
FIG. 3A depicts a perspective view of an exemplary speaker assembly with damping material (depicted unassembled)

Reference is now made to FIG. 3A, which depicts a perspective view of an exemplary speaker assembly 300 (shown unassembled for purposes of illustration). The speaker assembly 300 includes a speaker driver 302 which may include features as described in application Ser. No. 11/421, 022, entitled "Speaker with Acoustic Damped Port," and described briefly above. For example, speaker driver 302 may include damping material 303 placed around a rear portion of a vented frame. The damping material may substantially cover or fills each of the one or more vents. As described above, the damping material may be a natural material, a synthetic material, a combination of natural materials, a combination of synthetic materials, or a combination of natural and synthetic materials. The damping material may be embodied in any of a variety of shapes and configurations and may substantially conform to the shape and configuration of the rear portion of the frame. The speaker driver may also include a regulating member (not shown) adjacent to the rear portion of the frame. The regulating member causes air to flow from behind the rear portion of the frame through the damping material.

When assembled, speaker driver 302 is housed in a substantially airtight enclosure 304. Enclosure 304 may include a front portion 306 and a rear portion 308. When assembled, the front portion 306 and rear portion 308 may be held together by one or more fastening members such as screws (not shown). An O-ring seal may be used at the joint between front portion 306 and rear portion 308 to provide a substantially airtight seal.

In accordance with some embodiments, the size of speaker assembly 300 is relatively small. The small size allows for ease of portability. For example, in one embodiment, the speaker assembly 300 is of a size comparable to a pocket-sized electronic device, and has an enclosure 304 with dimensions of approximately 5.25 inches in length, approximately 3.24 inches in width, and approximately 0.85 inch in height. The internal volume of the sealed speaker assembly can be as small as or smaller than 7 cubic inches. The internal volume of the entire sealed speaker assembly 300 in the depicted embodiment is approximately 6.5 cubic inches. It should be appreciated, however, that other dimensions and volumes may be used.

The speaker assembly 300 may further include one or more microphones 310a and 310b. Microphones 310a and 310b may be disposed in microphone cavities 317a and 317b, respectively, preferably in the acoustic centers of the cavities. In one embodiment, each of the one or more microphones 310a and 310b includes a gated microphone with intelligent switching. In one embodiment, each of the one or more microphones 310a and 310b includes a cardioid microphone with a pick-up range of approximately 200 Hz to approximately 20 kHz. Accordingly, such an embodiment is well-suited for audio conferencing applications. In one embodiment, each of the one or more microphones 310a and 310b can pick up audio from a distance of at least approximately seven feet, which is suitable for audio conferencing with one-on-one as well as group conversations. Acoustic shadowing is enhanced by the construction of microphone cavities 317a and 317b and the relative angle of the cardioid microphone backside null. The total effect is to give much better speaker to microphone acoustic isolation equaling performance of much larger conference phones.

The speaker assembly 300 may further include a printed circuit board 312 housed within enclosure 304. One or more connection terminals 313 of the speaker driver 302 may be coupled to printed circuit board 312. Microphone 310a may be coupled to printed circuit board 312 via one or more wires 314a. Microphone 310b may be coupled to printed circuit board 312 via one or more wires 314b. The speaker driver 302, microphone 310a, and microphone 310b may be coupled to a processor on the printed circuit board 312. The processor may perform analog-to-digital conversion, digital-to-analog conversion, and other signal processing tasks in connection with audio received from the one or more microphones 310a and 310b and audio sent to speaker driver 302.

The printed circuit board 312 may include additional components such as hardware, software, firmware, or any combination thereof. For example, the components may include an audio processor or firmware for performing automatic gain control. The components may include an audio processor or firmware for automatically reducing or eliminating echoes and feedback. The components may include an audio processor or firmware for enabling full-duplex audio.

The printed circuit board 312 may further include an interface 316 to an external device such as a computer. Accordingly, the speaker assembly 300 may be used as a computer peripheral, for delivering high-quality voice, music, and/or other audio. Furthermore, the speaker assembly 300, with one or more microphones 310a and 310b, may be used as a speakerphone unit for audio conferencing, including VoIP conferencing. The interface 316 may include an interface for a wired or a wireless connection to the external device. In one embodiment, the interface 316 may include a USB (Universal Serial Bus)-compliant interface to a USB cable 334. Power may be provided to the speaker assembly 300 via the USB cable. In alternative embodiments, power may be supplied to the speaker assembly 300 by a power supply.

The printed circuit board 312 may be coupled to a user interface for controlling various functions of the speaker assembly 300. The user interface may provide information to the user, in addition to receiving input from the user.

In one embodiment, the speaker assembly 300 delivers high-fidelity wideband audio, with a frequency response of approximately 300 Hz to approximately 19 kHz. Output is improved at low frequencies, and the response is maximally flat at approximately 200 Hz, without resorting to amplifier compensation techniques. In addition, total harmonic distortion ("THD") can be reduced in some embodiments.

Figure 3B:
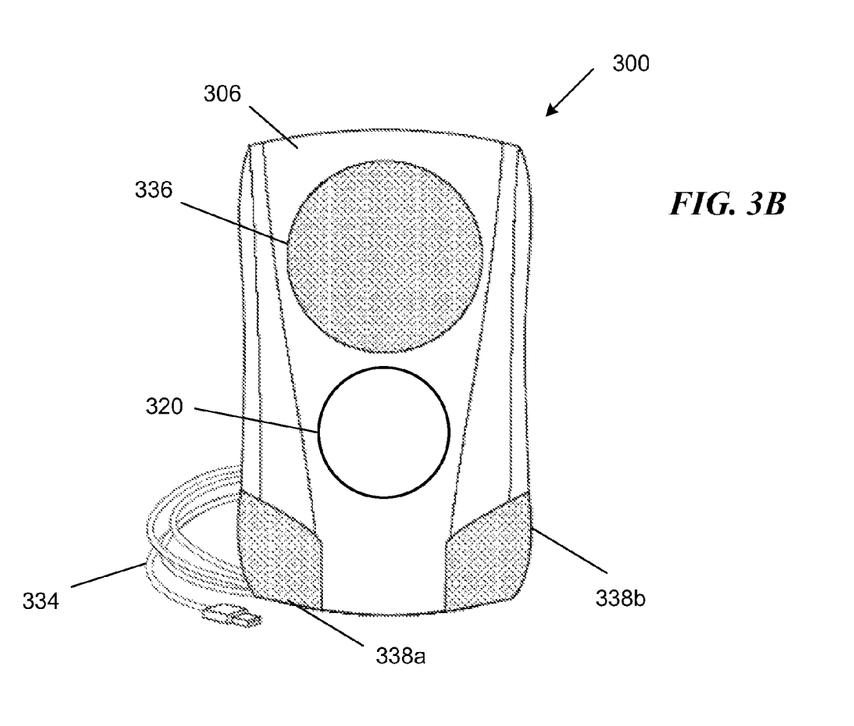
FIG. 3B depicts a front elevational view of an exemplary speaker assembly.

FIG. 3B depicts a front elevational view of the speaker assembly 300 in accordance with one embodiment. The speaker assembly 300 includes a speaker grill 336. The speaker grill 336 may include a mesh screen which may be composed of metal in some embodiments. The speaker assembly 300 may further include one or more microphone grills 338a and 338b. Each of the one or more microphone grills 338a and 338b may include a mesh screen which may be composed of metal in some embodiments.

Figure 3C:
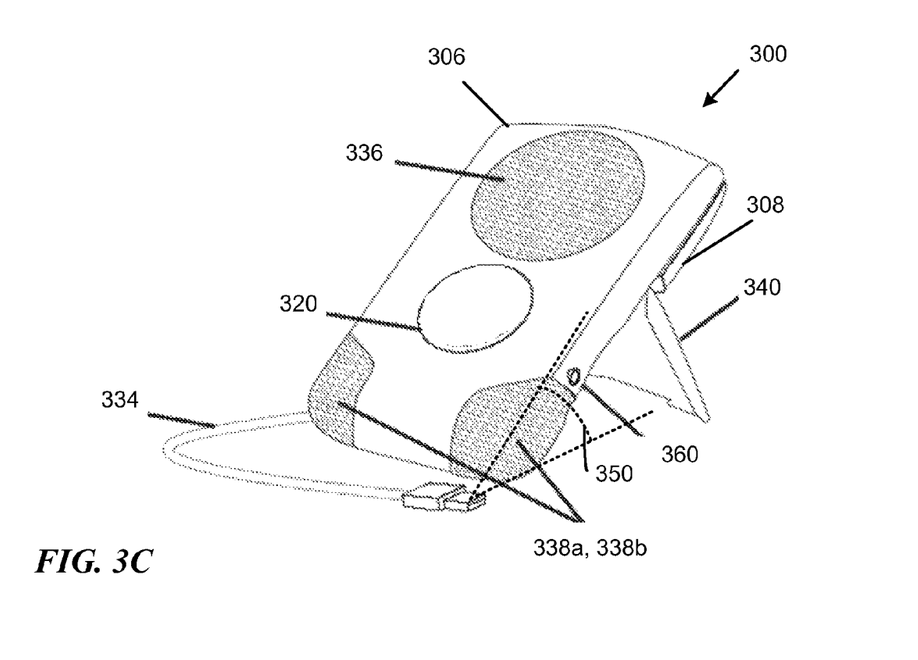
FIG. 3C depicts a perspective view of the exemplary speaker assembly of FIG. 3A.

A perspective view of the speaker assembly 300 is depicted in FIG. 3C. The rear portion 308 of the enclosure 304 may include a stand member 340 which can allow the speaker assembly 300 to be positioned at an angle 350 relative to the surface upon which the speaker assembly 300 rests. The stand member 340 may be hinged so as to be in an open configuration when the speaker assembly 300 is in use, or in a closed configuration when not in use. As a non-limiting example, an acute angle 350 of approximately 40 degrees has been found to be suitable for audio conferencing purposes. It will be appreciated, however, that other angles may be suitable.

The speaker assembly 300 may optionally include a port 360 for connecting to an auxiliary audio output device. For example, an auxiliary headset or earpiece may be used for occasions when listening in private is preferred. In some embodiments, a 3.5 mm headphone jack or a USB port may be used. In some embodiments, the auxiliary headset or earpiece may receive audio from the speaker assembly 300 wirelessly.

Figure 5:
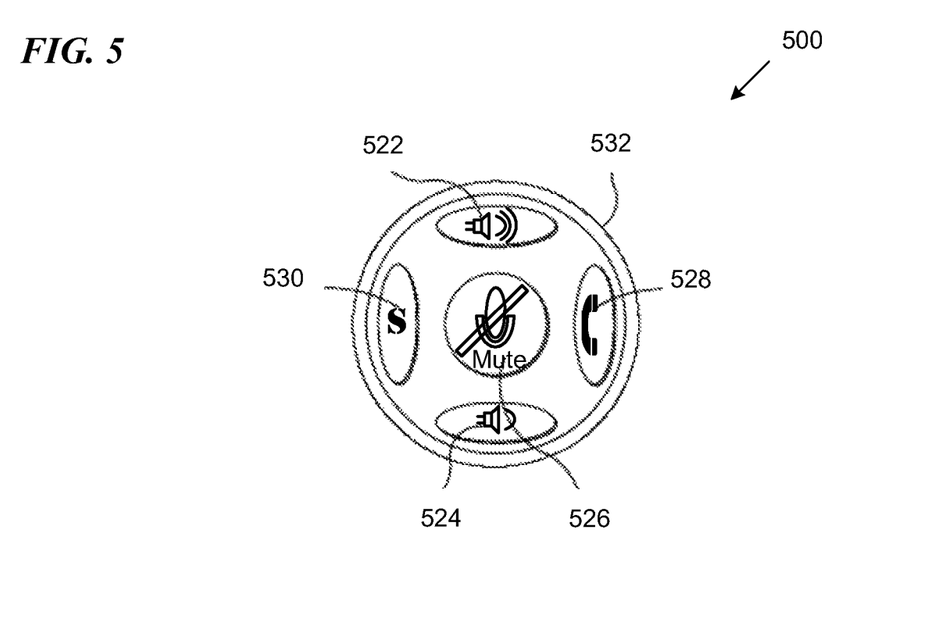
FIG. 5 depicts an exemplary user interface for an audio conferencing system.

The speaker assembly 300 may also include a user interface 320 for receiving user input and/or displaying information to the user. An exemplary embodiment of a user interface is depicted in FIG. 5. The user interface 500 of FIG. 5 may provide speaker volume control. For example, a button 522 may be pressed to increase speaker volume, and a button 524 may be pressed to decrease speaker volume.

The user interface 500 may provide a muting function. For example, a button 526 may be pressed to enable (or disable), muting of each of the one or more microphones 310a and 310b. The button 526 may also be used to mute the speaker, in some embodiments. The user interface 520 may include a button 528 which may be pressed to receive (or hang up) a call.

The user interface 500 may include a button 530 which may be pressed to launch a software application on the computer or other external device. The software application may include an application for enabling audio conferencing. For example, the application may include an application that enables VoIP calls. Thus, in some embodiments, the speaker assembly functions as part of a speakerphone.

The user interface 500 may include an indicator 532 for indicating status of a call. For example, the indicator 532 may include an LED indicator which is lit during a call. In one embodiment, the indicator 532 may be lit in one color (such as red, for example) during a call when mute is enabled, and may be lit in another color (such as green, for example) during a call when mute is disabled.

Figure 4:
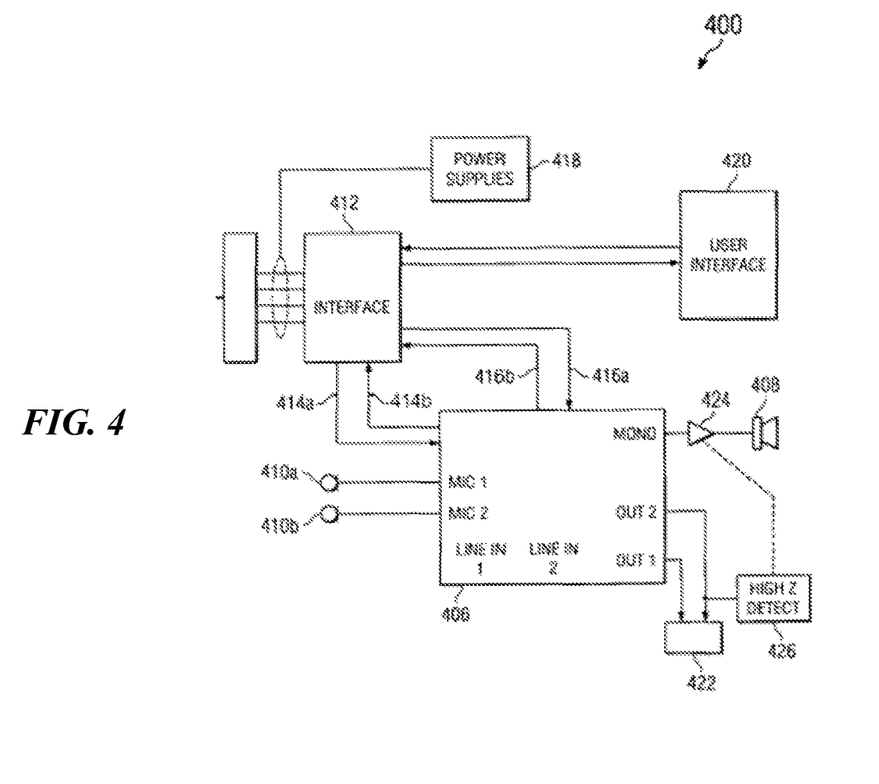
FIG. 4 depicts a block diagram of an exemplary system for audio conferencing.

Reference is now made to FIG. 4 which depicts an exemplary block diagram of a speaker assembly 400, as disclosed herein. The speaker assembly 400 includes an audio processor 406 and a speaker driver 408 enclosed in a substantially airtight enclosure. An example of a suitable audio processor 406 is the AK4569 CODEC manufactured by Asahi-Kasei. Speaker driver 408 may include features as described in application Ser. No. 11/421,022, entitled "Speaker with Acoustic Damped Port," referenced above. For example, speaker driver 408 may include damping material placed around a rear portion of a vented frame.

The audio processor 406 may be further coupled to one or more microphones 410a and 410b enclosed within the enclosure. The audio processor 406 may be further coupled to an interface 412 for a wired or a wireless connection to an external device such as a conferencing endpoint device. Control data may be transmitted between the interface 412 and the audio processor 406 via one or more control lines 414a and 414b. CODEC data may be transmitted between the interface 412 and the audio processor 406 via one or more data lines 416a and 416b. In one embodiment, the interface 412 may include a USB-compliant interface, such as the TAS1020B peripheral interface manufactured by Texas Instruments. Power may be provided to the speaker assembly 400 via a USB cable, for example, or by one or more power supplies 418. The interface 412 may also be coupled to a user interface 420. The user interface 420 may receive user input for controlling various functions of the speaker assembly 400. The user interface 420 may also provide information, such as status information, to the user.

The speaker assembly 400 may optionally include an auxiliary audio output interface 422. As one non-limiting example, the auxiliary audio output interface 422 may include a port for receiving a connector to one or more external speakers. The one or more speakers may be integrated with or may be external to the external device (which may be a conferencing endpoint device). In some embodiments, the one or more external speakers may receive audio from the speaker assembly 400 wirelessly. As another non-limiting example, the output interface may include a port for receiving an external headphone or earpiece. A headphone or earpiece may be desirable for occasions when listening in private is preferred. In some embodiments, a 3.5 mm headphone jack or a USB port may be used. In some embodiments, the headphone or earpiece may receive audio from the speaker assembly 400 wirelessly.

The speaker assembly may further include an amplifier 424. The amplifier 424 may amplify the audio signal sent to the speaker driver 408. The speaker assembly 400 may optionally include a high Z (impedance) detector 426. The high Z detector 426 may be coupled to the amplifier 424. The high Z detector may also be coupled to the auxiliary audio output interface 422.

Figure 6:
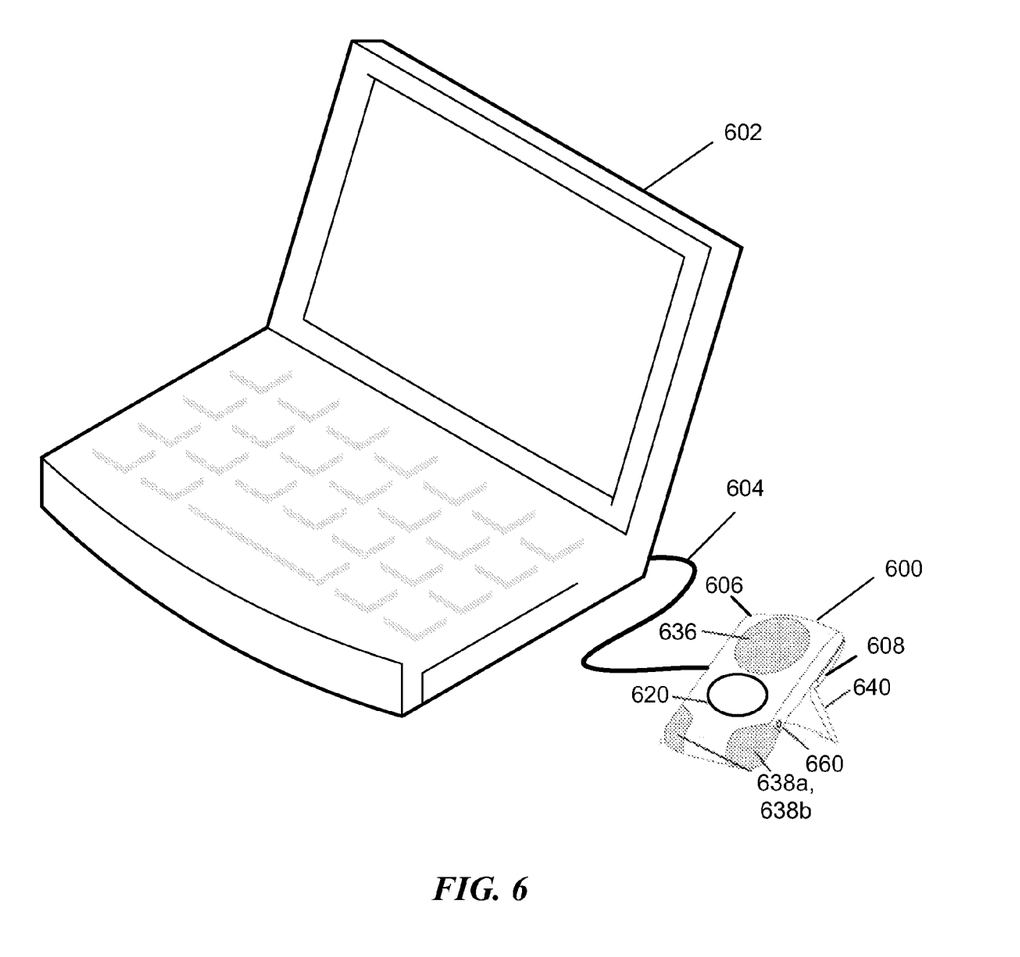
FIG. 6 depicts a block diagram of an exemplary system for audio conferencing.

Reference is now made to FIG. 6 which depicts an exemplary system for audio conferencing. The system includes a speaker assembly 600, which may resemble speaker assembly 300 in many respects. The system further includes a conferencing endpoint device 602. The conferencing endpoint device 602 may include, for example, a computer or laptop computer, or any device capable of receiving and/or sending VoIP calls, such as an IP phone or other device. The speaker assembly 600 is communicably coupled to the conferencing endpoint device 602 via a connection 604, which may be wired or wireless. In one embodiment, the connection 604 may include a USB cable.

Figure 7:
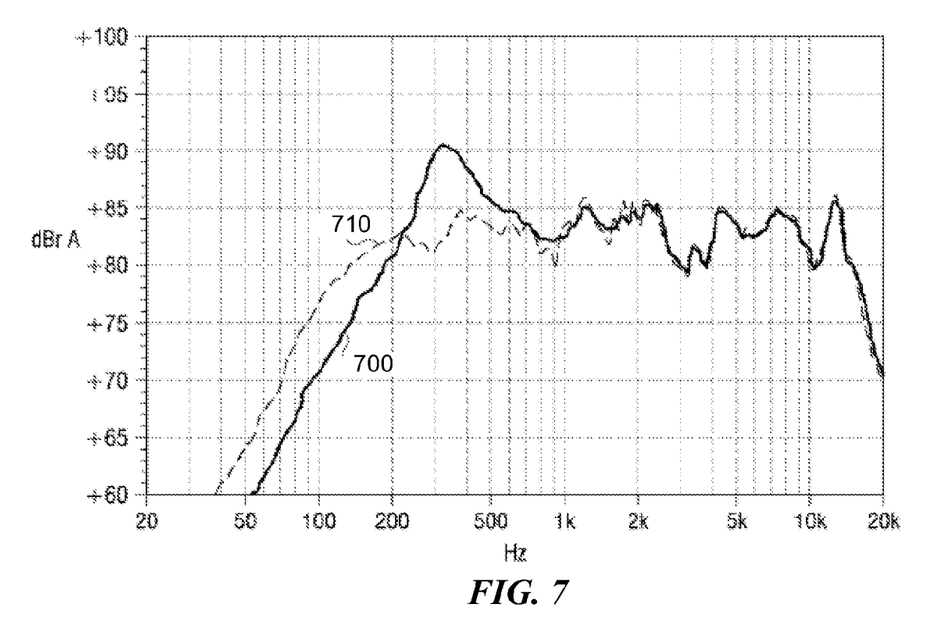
FIG. 7 depicts an exemplary frequency response curve.

The speaker assembly disclosed herein delivers high-fidelity wideband audio with a flat frequency response within the range of approximately 300 Hz to approximately 19 kHz. A graphical representation of an exemplary frequency response for two different scenarios is depicted in FIG. 7. Curve 700 represents a response curve given by a 50 mm speaker in an enclosure of 6.5 cubic inches without any damping material. The use of damping material on the same speaker and same enclosure yields response curve 510. As shown in FIG. 5, output is improved at low frequencies by using the damping material, and the response is maximally flat at approximately 200 Hz, without resorting to amplifier compensation techniques.

Figure 8:
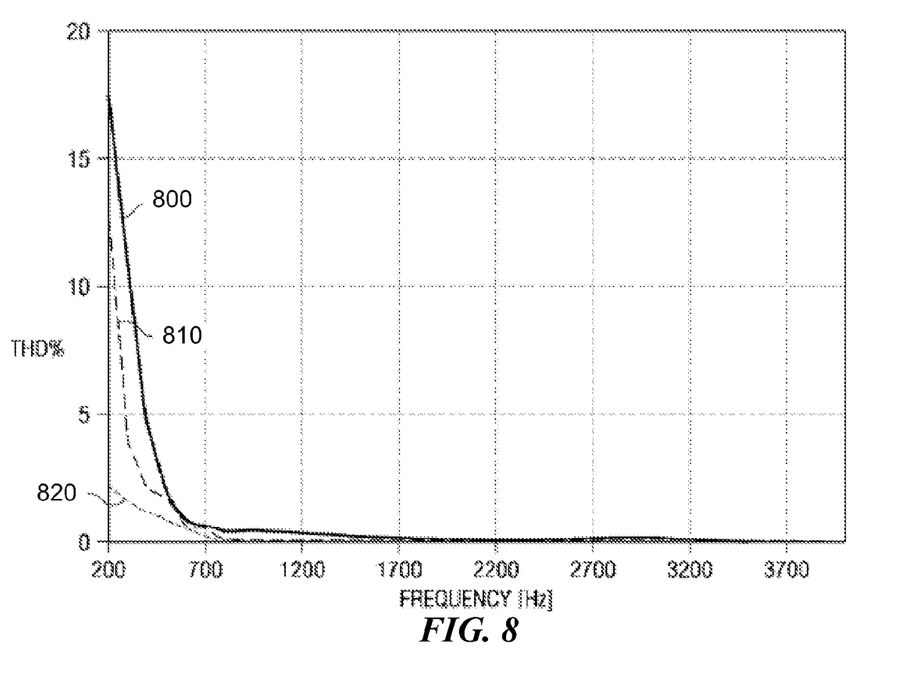
FIG. 8 depicts an exemplary plot of total harmonic distortion vs. frequency.

FIG. 8 depicts total harmonic distortion ("THD") vs. frequency, for three different exemplary scenarios. Curve 800 represents the THD when no damping material is used. Curve 810 represents the THD when using a man-made damping material. Curve 820 represents the THD when using a natural damping material.

While illustrative embodiments of the invention have been illustrated and described, it will be appreciated that various changes can be made therein without departing from the spirit and scope of the invention. It is intended that the appended claims cover all such modifications and variations as fall within the true spirit and scope of this present invention. To the extent such modifications and variations fall within the scope of the appended claims and their equivalents, they are intended to be covered by this patent.

The invention claimed is:

1. A speaker assembly comprising:
   an enclosure; acoustic damping material housed within the enclosure and behind the speaker driver; a speaker driver housed within the enclosure; and a processor housed within the enclosure, wherein the processor is coupled to the speaker driver,
   wherein the enclosure has an internal volume of less than about 7 cubic inches or less, and wherein the speaker assembly is capable of a substantially flat frequency response in the range of approximately 300 Hz to approximately 19 kHz through at least the combination of the speaker driver and the acoustic damping material.

2. The speaker assembly of claim 1, wherein the enclosure is substantially airtight.

3. The speaker assembly of claim 1, wherein the processor provides echo reduction on an audio signal.

4. The speaker assembly of claim 1, wherein the processor provides processing of full-duplex audio.

5. The speaker assembly of claim 1, further comprising one or more microphones coupled to the processor.

6. The speaker assembly of claim 1, further comprising an interface to a device located outside the enclosure, wherein the interface is coupled to the processor.

7. The speaker assembly of claim 6, wherein the interface comprises a USB-compliant interface.

8. The speaker assembly of claim 6, wherein the device comprises a computer.

9. The speaker assembly of claim 1, further comprising a user interface communicably coupled to the processor.

10. The speaker assembly of claim 9, wherein the user interface comprises an input device configured to control volume level of the speaker assembly.

11. The speaker assembly of claim 9, wherein the user interface comprises a status indicator.

12. The speaker assembly of claim 1, further comprising a stand member coupled to the enclosure, wherein the stand member is configured to position the speaker assembly to lie at an acute angle relative to a surface on which the speaker assembly rests.

13. The speaker assembly of claim 12, wherein the angle is approximately forty degrees.

14. The speaker assembly of claim 12, further comprising an auxiliary audio output interface coupled to the processor.

15. The speaker assembly of claim 1, wherein the internal volume of the enclosure is about 6.5 cubic inches.

16. A speaker assembly comprising:
an enclosure; acoustic damping material housed within the enclosure and behind the speaker driver; a speaker driver housed within the enclosure; and one or more microphones; wherein the enclosure has an internal volume of less than about 7 cubic inches or less, and wherein the speaker assembly is capable of a substantially flat frequency response in the range of approximately 300 Hz to approximately 19 kHz through at least the combination of the speaker driver and the acoustic damping material.

17. The speaker assembly of claim 16, wherein the one or more microphones are outside the enclosure.

18. A system for audio conferencing comprising:
a conferencing endpoint device; and a speaker assembly communicably coupled to the conferencing endpoint device, wherein the speaker assembly comprises:
an enclosure; acoustic damping material housed within the enclosure and behind the speaker driver; a speaker driver housed within the enclosure; a processor housed within the enclosure; and one or more microphones housed outside the enclosure;
wherein the processor is coupled to the speaker driver, wherein the processor is coupled to each of the one or more microphones, wherein the enclosure has an internal volume of less than about 7 cubic inches or less, and wherein the speaker assembly is capable of a substantially flat frequency response in the range of approximately 300 Hz to approximately 19 kHz through at least the combination of the speaker driver and the acoustic damping material.

19. The system of claim 18, wherein the conferencing endpoint device comprises an IP phone.

20. The system of claim 18, wherein the conferencing endpoint device comprises a computer.

21. The system of claim 20, wherein the computer comprises a computer-readable medium containing computer-executable instructions for dialing a phone number.

22. The system of claim 20, wherein the computer comprises a computer-readable medium containing computer-executable instructions for sending and receiving VoIP data.

23. The system of claim 18, wherein the speaker assembly is communicably coupled to the conferencing endpoint device via a wireless connection.

24. The system of claim 18, wherein the speaker assembly is communicably coupled to the conferencing endpoint device via a wired connection.

25. The system of claim 18, wherein the speaker assembly is communicably coupled to the conferencing endpoint device via a USB cable.

26. The system of claim 18, wherein the processor comprises a means for performing echo reduction on an audio signal.

27. The system of claim 18, wherein the processor comprises a means for processing full-duplex audio.

28. The system of claim 18, wherein the speaker assembly further comprises a user interface communicably coupled to the processor.

29. The system of claim 28, wherein the user interface comprises an input device configured to control volume of the speaker assembly.

30. The system of claim 28, wherein the user interface comprises a status indicator.

31. The system of claim 18, wherein the speaker assembly further comprises a stand member coupled to the enclosure, wherein the stand member is configured to position the speaker assembly to lie at an acute angle relative to a surface on which the speaker assembly rests.

32. The system of claim 31, wherein the angle is approximately forty degrees.

33. The system of claim 18, wherein the speaker assembly further comprises an auxiliary audio output interface coupled to the processor.

34. The system of claim 18 herein the enclosure has an internal volume of about 6.5 cubic inches.

* * * * *